(12) United States Patent
Kim et al.

(10) Patent No.: US 8,030,364 B2
(45) Date of Patent: Oct. 4, 2011

(54) POLYOLS AND POLYURETHANES, POLYURETHANEFORMS USING THE SAME

(76) Inventors: Do Gyun Kim, Yongin (KR); Hyosung Kim, Yongin (KR)

( * ) Notice: Subject to any disclaimer, the term of this patent is extended or adjusted under 35 U.S.C. 154(b) by 410 days.

(21) Appl. No.: 11/577,050

(22) PCT Filed: Oct. 10, 2005

(86) PCT No.: PCT/KR2005/003366
§ 371 (c)(1),
(2), (4) Date: Apr. 11, 2007

(87) PCT Pub. No.: WO2006/080743
PCT Pub. Date: Aug. 3, 2006

(65) Prior Publication Data
US 2009/0023823 A1    Jan. 22, 2009

(30) Foreign Application Priority Data
Oct. 11, 2004   (KR) ................ 10-2004-0081160

(51) Int. Cl.
*C08J 11/04*    (2006.01)

(52) U.S. Cl. ....... 521/49.5; 521/40; 521/40.5; 521/48.5; 521/49; 521/49.8; 528/74.5; 528/272; 528/295.5; 528/308.2; 528/332; 528/335; 528/480; 528/486; 528/495

(58) Field of Classification Search ........ 521/42, 521/43.5, 44, 49.5, 49.8, 40, 41, 48, 48.5, 521/40.5, 43, 49; 528/74.5, 271, 272, 295.5, 528/308.2, 308.3, 310, 332, 335, 480, 486, 528/495
See application file for complete search history.

(56) References Cited

U.S. PATENT DOCUMENTS

| | | | |
|---|---|---|---|
| 4,442,237 A | 4/1984 | Zimmerman et al. | |
| 5,518,571 A * | 5/1996 | Puerkner et al. | 156/332 |
| 5,532,404 A | 7/1996 | Gallagher | |
| 5,948,828 A | 9/1999 | Reck | |
| 6,867,322 B1 * | 3/2005 | Kato et al. | 560/78 |
| 7,166,690 B2 * | 1/2007 | Kim | 528/480 |
| 7,511,081 B2 * | 3/2009 | Kim et al. | 521/49.5 |
| 7,723,006 B2 | 5/2010 | Kim et al. | |
| 2011/0039959 A1 | 2/2011 | Kim et al. | |

FOREIGN PATENT DOCUMENTS

| | | | |
|---|---|---|---|
| DE | 199 63 731 | | 7/2001 |
| JP | 9-324027 | | 12/1997 |
| JP | 2001-081152 | | 3/2001 |
| JP | WO01/19764 | * | 3/2001 |
| JP | 2003-112153 | * | 4/2003 |
| JP | 2004-244443 | | 9/2004 |
| KR | 1020030049624 | | 6/2003 |
| KR | 1020030056258 | | 7/2003 |
| KR | 1020050095504 | | 9/2005 |
| WO | WO 03/051956 | | 6/2003 |

OTHER PUBLICATIONS

Machine translation of JP 2003-112153.*

* cited by examiner

*Primary Examiner* — James Seidleck
*Assistant Examiner* — Frances Tischler
(74) *Attorney, Agent, or Firm* — Greenlee Sullivan P.C.

(57) ABSTRACT

The present invention relates to a preparing method of polyols, polyurethane and polyurethane foams using the same. Polyester, polyamide and polyurethane are depolymerized with the polymeric fatty acid mono(polyhydroxyl alcohol)ide composition and additionally reacted with the polybasic acid, polyol and amine to prepare acid value of 05-~1 mgKOH/g, hydroxyl value of 10~500 mgKOH/g, and amine value of 1~50 mgKOH/g in polyol. This is to transform the double bond of the unsaturated fatty acid from the component of the oils and fats into a conjugated double bond to induce the Diels-Alder reaction, and with the improvement of the reactivity to form a stable combination in the chemical structure to prevent the separate leaching appearance of fat and fatty oil from the final product. In particular, by recycling waste edible oil and waste synthetic resin that can be employed as industrially useful material, the invention provides environment advantages.

4 Claims, No Drawings

POLYOLS AND POLYURETHANES, POLYURETHANEFORMS USING THE SAME

TECHNICAL FIELD

The present invention relates to a process for preparing a polyol composition and polyurethane and polyurethane foams using the same. The invention relates to a process for preparing a polyol by depolymerizing the polyester, polyamide and polyurethane with the polymeric fatty acid mono (polyhydroxyl alcohol)ide composition obtained by reacting a polyhydric alcohol with a polymeric fatty acid glyceride ester, and additionally reacting with polybasic acid, polyhydric alcohol and amine to have an acid value of 0.5-1 mgKOH/g, hydroxyl value of 10-500 mgKOH/g, and amine value of 1-50 mgKOH/g (in polyol). This is to transform the double bond of the unsaturated fatty acid from the fatty ingredient into a conjugated double bond to induce the Diels-Alder reaction, and with the improvement of the reactivity to form solid combination in chemical structure to prevent the separated leaching phenomenon of fatty and fatty oil from the final product. The polyol composition has fine compatibility with polyether-polyols as well as transparency and storage stability. Furthermore, it has 100% solid with very low viscosity at room temperature for easy handling while having a great reaction with isocyanate. This preparing method prepares a polyol that has excellent chemical and mechanical properties.

BACKGROUND ART

In the past, polyester polyols have been prepared by reacting the polybasic acid and polyhydric alcohol in a condensation-polymerization reaction to reach an appropriate acid value and a hydroxyl value. The synthesized polyols do not have good compatibility with polyether polyols and others that are mainly used for polyurethane forms. The polyols are not transparent at the room temperature or too high of viscosity to use at the temperature of 60° C., incurring inconvenience. Also, low stability and storage capability of the polyol has generated substantial limitations in use. Furthermore, it has many problems in mechanical property of the forms and decline in insulation, so that there has been steady demand for improvement.

DISCLOSURE OF INVENTION

Technical Problem

The present inventors have been intensely researching and studying to solve various problems associated with the previous technologies, and as a result, they found a process to prepare a polyol having good transparency, low viscosity at room temperature, stability, storage capability, and compatibility with polyether-polyols by depolymerizing a polymer with the polymeric fatty acid mono(polyhydroxyl alcohol)ide composition then adding the polybasic acid and polyhydric alcohol to carry out the polycondensation reaction. Then the amine is applied to prepare the amine adduct composition to obtain the polyol having function of surfactant that has transparency at room temperature, low viscosity, fine stability and storage capability as well as great compatibility with polyether-polyol in a way to provide a method to prepare fine properties of polyurethane and polyurethane foams and to provide polyol and polyurethane foams. Therefore, it is an object of the present invention to provide a process for preparing a polyol by recycling waste materials.

Technical Solution

In order to solve the foregoing technical problems, the present invention is disclosed in the following first embodiment:

(a) reacting the polyhydric alcohol with the polymeric fatty acid glyceride ester that includes the waste edible oil to obtain the polymeric fatty acid mono(polyhydroxyl alcohol)ide composition;

(b) add the polyester that includes the waste PET to the composition of step (a) for depolymerization by trans-esterification reaction, then add the polybasic acid and polyhydric alcohol to control for appropriate acid value and hydroxyl value to obtain the depolymerization oligomer composition.

In order to solve the foregoing technical problems, the present invention is disclosed in the following second embodiment:

(a) reacting the polyhydric alcohol with the polymeric fatty acid glyceride ester that includes the waste edible oil to prepare the polymeric fatty acid mono(polyhydroxyl alcohol)ide composition;

(b) add the polyester that includes the waste PET to the composition of step (a) for depolymerization by the trans-esterification reaction, then add the polybasic acid and polyhydric alcohol to control for appropriate acid value and hydroxyl value to obtain the depolymerization oligomer composition;

(c) add the amine to the composition of step (b) to obtain the polyol composition that contains the amine adduct having function of surfactant.

In order to solve the foregoing technical problems, the present invention is disclosed in the following third embodiment:

(a) reacting the polyhydric alcohol with the polymeric fatty acid glyceride ester that includes the waste edible oil to prepare the polymeric fatty acid mono(polyhydroxyl alcohol)ide composition;

(b) add the mixed wastes of the polyamide and waste PET to the composition of step (a) for depolymerization by the trans-esterification reaction, then add the polybasic acid and polyhydric alcohol to control for appropriate acid value and hydroxyl value to obtain the depolymerized oligomer composition.

In order to solve the foregoing technical problems, the present invention is disclosed in the following fourth embodiment:

(a) reacting the polyhydric alcohol with the polymeric fatty acid glyceride ester that includes the waste edible oil to obtain the polymeric fatty acid mono(polyhydroxyl alcohol)ide composition;

(b) add the mixed wastes of the polyamide and PET to the composition of step (a) for depolymerization by the trans-esterification reaction, then add the polybasic acid and polyol to control for appropriate acid value and hydroxyl value to obtain the depolymerized oligomer composition;

(c) add the amine to the composition of step (b) to prepare the polyol composition that contains the amine adduct having the function of surfactant.

In order to achieve the foregoing technical problems, the present invention is disclosed in the following fifth embodiment:

(a) reacting the polyhydric alcohol with the polymeric fatty acid glyceride ester that includes the waste edible oil to obtain the polymeric fatty acid mono(polyhydroxyl alcohol)ide composition;

(b) add the lump polyester-amide resin following the patent application of NO. 10-2004-0020944 in Korea to the composition of step (a) for the trans-esterification reaction, then control for appropriate acid value and hydroxyl value.

In order to solve the foregoing technical problems, the present invention is disclosed in the following sixth embodiment:

(a) reacting the polyhydric alcohol with the polymeric fatty acid glyceride ester that includes the waste edible oil to obtain the polymeric fatty acid mono(polyhydroxyl alcohol)ide composition;

(b) add the polybasic acid and polyhydric alcohol to the composition of step (a) and control for appropriate acid value and hydroxyl value to obtain the polycondensation polyester oligomer composition; and (c) add the amine to the composition of step (b) to obtain the polyol composition that contains the amine adduct having the function of surfactant.

Best Mode For Carrying Out The Invention

Next, the following is the detailed description of the method of providing the polyol for each embodiment.

In embodiment 1, embodiment 2, embodiment 3, embodiment 4, embodiment 5, and embodiment 6 of the present invention, the waste edible oil that can be used in step (a) is animal and vegetable oil that had been used and disposed from household, chicken house, fry specialty shop, fish bowl producer, ramen (instant noodle) producer and others. The refined polymeric fatty acid glyceride ester is prepared by reacting oil with the catalysts, for example, lead oxide, magnesium hydroxide and others, in the amount 0.5-5% by weight based on the weight of the oil and carried out in the range of 200-290° C. for 2-20 hours. Specified examples of the vegetable oils are soy bean oil, corn oil, cotton seed oil, sunflower oil, castor oil, palm tree oil, peanut oil, palm oil and others while the animal oils are beef oil, pork oil, fish oil, hardened oil and others. The polyhydric alcohols that can be used in step (a) are ethylene glycol, propylene glycol, diethylene glycol, 1,4 butane diol, 1,6 hexane diol, neopenthylglycol, dipropylene glycol, trimethylol propane, glycerol, and pentaerythritol, and they can be used alone or in mixture. They are desirable to add in the volume of 0.1-10 ratio to the waste edible oil and polymeric fatty acid glyceride ester. The catalyst, for example, lead oxide, sodium hydroxide, lithium carbonate and others, is desirable to use in the amount 0.1-1% by weight based on the total weight of the reactant. For the polymer in step (b), the polyester is the chip obtained by mechanical crushing from PET polymer, waste PET fiber, waste PET bottle, waste PET product, waste polyester fiber, and polyester product synthesized from terephthalic acid with ethylene glycol, and the mixed waste product is the waste beer PET bottle, mixed fiber of the polyester and polyamide, and the combined product of polyester and polyamide. Specified examples of the polybasic acid are phthalic anhydride, isophthalic acid and its ester, terephthalic acid and its ester, 5-DMSSIP, adipic acid and its ester, azelaic acid, sebacic acid, anhydrous tetra hydrophthalic acid, anhydrous maleic acid, fumaric acid, itaconic acid, trimellitic acid, anhydrous trimellitic acid, anhydrous pyromellitic acid, succinic acid, cyclohexanedicarboxylic acid, naphthalene dicarboxylic acid, benzoic acid, dimer acid, C9-C27 fatty acid and others. They can be used alone or in mixture. It would be desirable to add them in the amount 1-50% by weight to the products of step (a). Specified examples of the polyhydric alcohol are ethylene glycol, propylene glycol, 1,3 propane diol, 1,4 butane diol, 1,6 hexane diol, neopentyl glycol, di-ethylene glycol, di-propylene glycol, polyethylene glycol, poly-propylene glycol, PTMEG, alkylene oxide adduct of bisphenol A, tri-methylol propane, glycerol, pentaerythritol and others. They can be used alone or in mixture. It would be desirable to add them in the amount 1-70% by weight based on the total weight of the reactant. The amines that can be used in step (c) are triethylamine, propylamine, butylamine, ethylenediamine, diethylenetriamine, triethylenetetramino, monoethanolamine, diethanolamine, triethanolamine, dimethylethanolamine, hexamethylenediamine, piperidine and others. They can be used alone or in mixture. It would be desirable to add them 1-50% by weight to the products of step (b). The catalysts for depolymerization at step (b) are the organic acid metal, tins, and alkali metal hydroxide. The substance is desirable to use in the amount of 0.05-5% by weight based on the weight of the reactant.

In order to solve the foregoing technical problems, the present invention is disclosed in the seventh embodiment:

(a) the waste polyurethane is reacted with the polymeric fatty acid mono(polyhydroxyl alcohol)ide composition prepared at step (a) of first embodiment of the present invention to decompose the urethane combination and prepare the polyether oligomer composition; and (b) add the polybasic acid and polyhydric alcohol to the composition obtained from step (a) for polycondensation, then add the carboxylic acid to process the excessively contained amine to control the amine value to obtain the polyether-polyol composition.

Originally, when recycling the waste polyurethane the polyol or amine has been used for the alcohol lysis or amino lysis reaction to decompose the urethane combination. The decomposed products would have the presence of the amine and it has emerged as a great difficulty in recycling of the polyurethane to remove it.

According to this embodiment, the amino group contained in the decomposed composition reacts first with the fatty acid in the molecule structure, and, as needed, it reacts with the added carboxyl acid to become amide. Thus reaction control is available in reaction with the isocyanate to enable recycling of polyurethane with the production of outstanding resin property. The polymeric fatty acid mono(polyhydroxyl alcohol)ide composition for waste polyurethane in step (a) would be desirable to use in the weight ratio of 1:0.1-5. The catalyst would be desirable to use in the amount 0.05-5% by weight for organic acid metal, tins, and alkali metal hydroxide. In step (b), the carboxyl acid can be acetate acid, oxalic acid, benzoic acid, salicylic acid and others alone or in mixture. It would be desirable to use them in the amount 1-30 weight % for the products.

The waste polyurethane is the chip obtained by mechanically crushing the insulation materials from refrigerator, artificial leather, sponge, cushion material, elastomer building material and others. The urethane combination and disintegration temperature of the present invention is obtained by heating at 150-270° C. for 1-15 hours. Under 150° C., the time for disintegration is excessively lengthened, and for over 270° C., it is thermal disintegration that it would not be desirable.

The following describes the invention that uses the polyol following the first through the seventh embodiments in the preparing method of polyurethane foams and polyurethane coating agent.

In using the polyol obtained from the first embodiment to the seventh embodiment, it would be desirable to obtain the mixed polyol of hydroxyl value 100-500 mgKOH/g by mixing the fresh polyether-polyol to have the hardness mechanical property of the polyurethane foams and other requirements.

Specified examples of the above polyether polyol are ethylene glycol, diethyleneglycol, propyleneglycol, trimethylpropane, glycerol, sorbitol, bisphenol A ethylene oxide-propylene oxide adduct, glycerol propylene oxide adduct, pentaerythritol ethylene oxide propylene oxide adduct, sucrose propylene oxide, ethylene oxide adduct, sorbitol, ethylene oxide-propylene oxide adduct and others with the average hydroxy value of the mixed polyol composition of 100-500, the NCO % of isocyanate of 30-100, NCO/OH of 1.0-1.5. Specified examples of the above isocyanate are toluene-di isocyanate, xylene di-isocyanate, crude-MDI, MDI, polymeric MDI, hexa methylene di-isocyanate, isophorone di-isocyanate, and isocyanate trimer. With the catalyst in amine, the concrete examples of the amine are tri-ethyl amine, ethanol amine, di-methyl ethanol amine, di-ethylene tri-amine, triethylenedi-amine, hexadecyl di-methyl amine, N-methyl morpholine, tetra methyl ethylene di-amine, di-methyl cyclohexyl amine, di-alkyl piperadins and others. For their reacting substance, it is desirable to use 1-10% by weight.

Originally, CFC and HCFC were used as the blowing agent, but these substances are known to destroy the ozone layer of the earth so that they are banned to use. Therefore, it is desirable to use for the replacement substances pentane, cyclopentane and water together. For the surfactant it is desirable to use the silicone surfactant.

Polyurethane foams of the present invention are formed basically in the chemical structure of polyol and isocyanate. The polyol ingredient contains the blowing agent with the reacting catalyst containing the surfactant, additive agent and others to react with the isocyanate that the independent vapor of the blowing agent is obtained from the insulation and intensity in polyurethane that are required in the polyurethane foams. Their properties are determined by the physical structure of cell diameter, cell dimension, cell distribution and other polyurethane foams that they are significantly influenced by the reaction and compatibility of each material and fluidity at the time of ejection. In particular, importance has to be placed in selecting the polyol, its configuration and combination.

The polyol obtained from the present invention has the partial solubility of the blowing agent, pentane and cyclopentane, and it increases the $CO_2$ ejection pressure in and out of the cell to prepare the easy control of the physical structure of cell diameter, cell dimension, cell distribution and polyurethane foams, and the polyurethane foams with improved insulation capability and increased mechanical intensity can be prepared.

The polyurethane coating substance of the present invention is basically formed in the chemical structure of polyol and isocyanate, and the isocyanate is added to the polyol composition that mixes the promoting agent, coloring agent, additive agent, solvent and others to the polymer component to coat on the textile, non-woven fabric, wooden material and others to produce the artificial leather or coating on the lumber surface.

The polyurethane formative product of the present invention is basically formed in the chemical structure of polyol and isocyanate, the isocyanate is added to the polyol composition that mixes the promoting agent, additive agent, flame retardant, filler and others to use for synthetic wood, artificial wood, sculpture substance and others.

MODE FOR THE INVENTION

Refer to the following examples hereto to prepare detailed description for the preparing method of the polyol and the polyurethane foams, polyurethane coating agent, and polyurethane formative work following from the embodiment 1 to embodiment 7 of the present invention. These examples are provided only for illustrating purposes of the present invention and should not be construed as limiting the scope and spirit of the present invention.

Example 1 of Synthesis 700 g of Soy bean oil and 1 g of magnesium hydroxide were charged to the reactor equipped with agitator, reflux condenser, thermometer, and nitrogen inlet and the mixture was heated under a stream of nitrogen for 15 hours at 250° C. for P of Gardener vapor viscosity meter to prepare the polymeric fatty acid glyceride ester.

Example 2 of Synthesis 700 g of fish oil and 1 g of lead oxide were charged to the reactor equipped with agitator, reflux condenser, thermometer, and nitrogen inlet and the mixture was heated under a stream of nitrogen for 15 hours at 250° C. for M of Gardener vapor viscosity meter to prepare the polymeric fatty acid glyceride ester.

Example 3 of Synthesis 450 g of polymeric fatty acid glyceride ester obtained from the Example 1 of Synthesis, 160 g of tri-methylol propane, and 0.2 g of lithium hydroxide, were charged to the reactor equipped with agitator, reflux condenser, thermometer, and nitrogen inlet and the mixture was heated under a stream of nitrogen to react for 2 hours at 250° C. and then cooling down and prepare the polymeric fatty acid mono(polyhydroxyl alcohol)ide composition.

Example 4 of Synthesis 450 g of polymeric fatty acid glyceride ester obtained from the Example 2 of Synthesis, 150 g of 1,4 butane diol and 0.3 g of lead oxide were charged to the reactor equipped with agitator, reflux condenser, thermometer, and nitrogen inlet and the mixture was heated under a stream of nitrogen to react for 2 hours at 250° C. and then cooling down and prepare the polymeric fatty acid mono(polyhydroxyl alcohol)ide composition.

Example 5 of Synthesis 450 g of waste edible oil, 150 g of glycerol and 0.2 g of sodium hydroxide were charged to the reactor equipped with agitator, reflux condenser, thermometer, and nitrogen inlet and the mixture was heated under a stream of nitrogen to react for 2 hours at 250° C. and then cooled down to prepare the polymeric fatty acid mono(polyhydroxyl alcohol)ide composition.

Example 6 of Synthesis 450 g of waste edible oil, 145 g of di-ethylene glycol and 0.2 g of lead oxide were charged to the reactor equipped with agitator, reflux condenser, thermometer, and nitrogen inlet and the mixture was heated under a stream of nitrogen to react for 2 hours at 250° C. and then cooled down to prepare the polymeric fatty acid mono(polyhydroxyl alcohol)ide composition.

Example 7 of Synthesis 250 g of polymeric fatty acid mono(polyhydroxyl alcohol)ide composition that is obtained from Example 3 of Synthesis, 70 g of terephthalic acid, 70 g of isophthalic acid, 200 g of ethylene glycol, 50 g of 1,4 butane diol and 0.2 g of dibutyl tin oxide (DBTO) were charged to the reactor equipped with agitator, reflux condenser, thermometer, and nitrogen inlet and the mixture was heated under a stream of nitrogen to react polycondensation for 7 hours at 230° C. and then cooled down and add 70 g of tri-ethanol amine under 150° C. and react for 3 hours at 200° C. to prepare the polymeric oil modified polyester amine adduct polyol (acid value for 0.5, hydroxyl value for 350 and amine value of 17.

Example 8 of Synthesis 300 g of polymeric fatty acid mono(polyhydroxyl alcohol)ide composition that is obtained from Example 4 of Synthesis, 70 g of terephthalic acid, 60 g of adipic acid, 150 g of diethylene glycol, 100 g of 1,4 butane diol and 0.2 g of DBTO were charged to the reactor equipped with agitator, reflux condenser, thermometer, and nitrogen inlet and the mixture was heated under a stream of nitrogen to react polycondensation for 10 hours at 230° C. and then cooling down and prepare polymeric oil modified polyester polyol having acid value of 0.9 and hydroxyl value of 410.

Example 9 of Synthesis 300 g of polymeric fatty acid mono(polyhydroxyl alcohol)ide composition that is obtained from Example 3, 300 g of PET (Kolon KP185) and 0.3 g of DBTO were charged to the reactor equipped with agitator, reflux condenser, thermometer, and nitrogen inlet and the mixture was heated under a stream of nitrogen to react depolymerization for 3 hours at 250° C. and then cooling down and add 5 g of adipic acid and 100 g of 1,4 butane diol at 170° C. to react polycondensation for 5 hours at 230° C. to prepare the polymeric oil modified polyester polyol having acid value of 0.8 mgKOH/g and hydroxyl value of 370 mgKOH/g.

Example 10 of Synthesis 300 g of polymeric fatty acid mono(polyhydroxyl alcohol)ide composition that is obtained from Example 5, 300 g of waste PET chip and 0.3 g of DBTO were charged to the reactor equipped with agitator, reflux condenser, thermometer, and nitrogen inlet and the mixture was heated under a stream of nitrogen to react depolymerization for 3 hours at 250° C. and then cooling down and add 5 g of adipic acid and 100 g of 1,4 butane diol at 170° C. to react polycondensation for 5 hours at 230° C. to prepare the polymeric oil modified polyester polyol having acid value of 0.9 mgKOH/g and hydroxyl value of 390 mgKOH/g.

Example 11 of Synthesis 300 g of polymeric fatty acid mono(polyhydroxyl alcohol)ide composition that is obtained from Example 5, 300 g of waste PET chip and 0.3 g of DBTO were charged to the reactor equipped with agitator, reflux condenser, thermometer, and nitrogen inlet and the mixture was heated under a stream of nitrogen to react depolymerization for 3 hours at 250° C. and then cooling down and add 5 g of adipic acid and 100 g of 1,4 butane diol at 170° C. to react polycondensation for 5 hours at 230° C., then add 90 g of di-ethanol amine under 150° C. to prepare the polymeric oil modified polyester amine adduct polyol with acid value of 0.8 mgKOH/g, hydroxyl value of 450 mgKOH/g and amine value of 10 mgKOH/g.

Example 12 of Synthesis 300 g of polymeric fatty acid mono(polyhydroxyl alcohol)ide composition that is obtained from Example 6 and add 300 g of mixed waste with the polyester(PET) and polyamide (nylon), 0.3 g of DBTO were charged to the reactor equipped with agitator, reflux condenser, thermometer, and nitrogen inlet and the mixture was heated under a stream of nitrogen to react depolymerization for 3 hours at 250° C. and then cooling down and add 5 g of adipic acid and 100 g of 1,4 butane diol at 170° C. to react polycondensation for 5 hours at 230° C., to obtain the polymeric oil modified polyester-amid polyol with acid value of 0.9 mgKOH/g and hydroxyl value of 455 mgKOH/g.

Example 13 of Synthesis 300 g of polymeric fatty acid mono(polyhydroxyl alcohol)ide composition that is obtained from Example 6 and add 300 g of mixed waste with the polyester(PET) and polyamide (nylon) and 0.3 g of DBTO were charged to the reactor equipped with agitator, reflux condenser, thermometer, and nitrogen inlet and the mixture was heated under a stream of nitrogen to react depolymerization for 3 hours at 250° C. and then cooling down and add 5 g of adipic acid and 100 g of 1,4 butane diol at 170° C. to react polycondensation for 5 hours at 230° C., and add 70 g of tri-ethanol amine under 150° C. to react for 2 hours at 200° C. then prepare the polymeric oil modified polyester-amid amine adduct polyol with acid value of 0.8 mgKOH/g, hydroxyl value of 495 mgKOH/g and amine value of 15 mgKOH/g.

Example 14 of Synthesis 300 g of polymeric fatty acid mono(polyhydroxyl alcohol)ide composition that is obtained from Example 5 of Synthesis, 350 g of polyester resin(polyester resin composition following PCT/KR2002/002359) by recycling of waste PET and 0.2 g of DBTO were charged to the reactor equipped with agitator, reflux condenser, thermometer, and nitrogen inlet and the mixture was heated under a stream of nitrogen to react depolymerization for 3 hours at 250° C. and then cooling down and add 5 g of adipic acid and 100 g of 1,4 butane diol at 170° C. to react polycondensation for 5 hours at 230° C., to obtain the polymeric oil modified polyester polyol with acid value of 0.8 mgKOH/g and hydroxyl value of 370 mgKOH/g.

Example 15 of Synthesis 300 g of polymeric fatty acid mono(polyhydroxyl alcohol)ide composition that is obtained from Example 5 of Synthesis, 350 g of polyester resin(polyester resin composition following PCT/KR2002/002359) by recycling of waste PET and 0.2 g of DBTO were charged to the reactor equipped with agitator, reflux condenser, thermometer, and nitrogen inlet and the mixture was heated to react for 3 hours at 250° C. and then cooling down and add 5 g of adipic acid and 100 g of 1,4 butane diol at 170° C. to react polycondensation for 5 hours at 230° C., and add 90 g of tri-ethanol amine under 150° C. to react for 3 hours at 200° C. to obtain the polymeric oil modified polyester-amide amine adduct polyol with acid value of 0.7 mgKOH/g, hydroxyl value of 370 mgKOH/g and amine value of 7 mgKOH/g.

Example 16 of Synthesis 300 g of polymeric fatty acid mono(polyhydroxyl alcohol)ide composition that is obtained from Example 6 of Synthesis, 300 g of polyester-amide lump resin following the polyesteramide resin (Patent application number in Korea: 10-2004-0020944) by recycling of mixed wastes of polyester (PET) and polyamide (nylon), 0.2 g of DBTO were charged to the reactor equipped with agitator, reflux condenser, thermometer, and nitrogen inlet and the mixture was heated under a stream of nitrogen to react depolymerization for 3 hours at 250° C. and then cooling down and add 5 g of adipic acid, 100 g of 1,4 butane diol at 170° C. to react polycondensation for 5 hours at 230° C., to obtain the polymeric oil modified polyester-amide polyol with acid value of 0.8 mgKOH/g and hydroxyl value of 450 mgKOH/g.

Example 17 of Synthesis 300 g of waste polyurethane chip, 200 g of polymeric fatty acid mono(polyhydroxyl alcohol)ide) composition obtained from Example 5 of Synthesis and 0.2 g of DBTO were charged to the reaction of 3 hours at 250° C. to carry out depolymerization, then add 50 g of benzoic acid to react with the excessive volume of amine to prepare the polyether-amide polyol for acid value of 0.5 mgKOH/g, hydroxyl value of 475 mgKOH/g, and amine value of 5 mgKOH/g.

Example 18 of Synthesis 350 g of waste polyurethane forms, 300 g of polymeric fatty acid mono(polyhydroxyl alcohol)ide) composition obtained from Example 6 of Synthesis and 0.3 g of DBTO were charged to the reaction of 3 hours at 250° C. to carry out depolymerization then add 50 g of acetate acid to react with the excessive volume of amine to prepare the polyether-fatty acid ester amid polyol having an acid value of 0.5 mgKOH/g, hydroxyl value of 495 mgKOH/g, and amine value of 6 mgKOH/g.

Example 19 of Synthesis 300 g of mixed wastes like the artificial leather coated with the polyurethane on the waste PET, waste polyamide, 300 g of polymeric fatty acid mono(polyhydroxyl alcohol)ide) composition obtained from Example 5 of Synthesis and 0.3 g of DBTO were charged to the reaction of 3 hours at 250° C. to carry out depolymerization, then add 50 g of acetate acid to react with the excessive volume of amine to prepare the polyetherpolyester-amide polyol having an acid value of 0.5 mgKOH/g, hydroxyl value of 485 mgKOH/g, and amine value of 5 mgKOH/g.

By using the polyol that is prepared from the above Examples of Synthesis, the polyurethane and polyurethane foams, the applied invention, is described in detail under these implementation examples.

Implementation Example 1

In the mixer setting with the agitator, 300 g of product of the Example 7 of Synthesis, 150 g of PP-2000 (Korea Polyol), 100 g of ethyl acetate and 0.5 g of DBTDL are mixed and add 200 g of toluene-di-isocyanate trimer gradually to prepare the lumber coating agent to coat on the floor, and observed the surface after 5 years. The surface is completely hardened to have outstanding elasticity, hardness and gloss and it particularly has the excellent film formed for outstanding durability.

Implementation Example 2

In the mixer setting with the agitator, 300 g of product of the Example 12 of Synthesis and 150 g of PP-2000 (Korea Polyol) are mixed and add 250 g of Cosmonate M-200 (Keumho Mitsui Chemical) gradually to prepare the lumber coating agent of non-solvent type to coat on the floor, and observed the surface after 5 years, and the surface is completely hardened to have outstanding elasticity and hardness and it particularly has the excellent film formed for outstanding durability.

Implementation Example 3

In the mixer setting with the agitator, 300 g of product of the Example 9 of Synthesis, 150 g of Example 17 of Synthesis, 100 g of Example 19 of Synthesis, 200 g of PTMEG, 0.5 g of DBTDL, and 200 g of di-methyl formamide in mixture, and MDI of 300 g is added in dropping under 50° C. to obtain the organic solution of polyurethane. Here, 100 g of coloring agent, 20 g of hardening agent are mixed to prepare the urethane coating agent in coating on the non-woven fabric to prepare the artificial leather to prepare, and it was able to obtain outstanding artificial leather with great adhesiveness, elasticity and contraction.

Implementation Example 4

In the mixer setting with the agitator, 100 g of product of the Example 11 of Synthesis, 100 g of Example 13 of Synthesis, 100 g of Example 15 of Synthesis, 100 g of Example 18 of Synthesis, 100 g of Example 19 of Synthesis, and 250 g of Cosmonate M-200 (Keumho Mitsui Chemical) is mixed on the high speed agitator into the mold frame to prepare the synthetic lumber.

Implementation Example 5

In the mixer setting with the agitator, 100 g of product of the Example 11 of Synthesis, 100 g of Example 13 of Synthesis, 100 g of Example 18 of Synthesis, 100 g of Example 19 of Synthesis, and 300 g of sawdust of wood are premixed and then 250 g of Cosmonate M-200 (Keumho Mitsui Chemical) is mixed on the high speed agitator into the mold frame to prepare the synthetic lumber.

Implementation Example 6

In the mixer setting with the agitator, 100 g of product of the Example 10 of Synthesis, 100 g of Example 14 of Synthesis, 100 g of Example 16 of Synthesis, 100 g of PTMEG 100 g, and 0.5 g of promoting agent, are mixed and then 300 g of Cosmonate M-200 (Keumho Mitsui Chemical) is applied gradually, and mixed and placed into the mold frame to prepare the plastic product.

Implementation Example 7

In the mixer setting with the agitator, 50 g of product of the Example 7 of Synthesis, 50 g of Example 9 of Synthesis, 50 g of Example 12 of Synthesis, 150 g of Example 18 of Synthesis, 9 g of surfactant F-317 (Sinetsu Chemical) 9 g of catalyst, Kaoriser (Kao Co., Ltd.), 30 g of blowing agent cyclopentane, and 7 g of water are mixed, and add 360 g of toluene-di-isocyanate in mixture with the high speed agitator to prepare the light urethane foam.

Implementations Example 8

In the mixer setting with the agitator, 50 g of product of the Example 14 of Synthesis, 50 g of Example 16 of Synthesis, 50 g of Example 17 of Synthesis, 50 g of Example 18 of Synthesis, 50 g of Example 19 of Synthesis, 7 g of surfactant F-317(Shinetsu Chemical), 7 g of catalyst, Kaoriser (Kao Co., Ltd.), 25 g of blowing agent cyclopentane, and 7 g of water are mixed, and then add 300 g of di-phenyl methane diisocyanate in mixture with the high speed agitator to prepare the light urethane foam.

Implementations Example 9

In the mixer setting with the agitator, 50 g of product of the Example 15 of Synthesis, 50 g of Example 16 of Synthesis, 50 g of Example 17 of Synthesis, 50 g of Example 18 of Synthesis, 50 g of glycerol+EO/PO additive polyol, 50 g of sucrose+EO/PO adduct polyol, 50 g of sorbitol+EO/PO adduct polyol, 10 g of surfactant F-317 (Shinetsu Chemical), 10 g of catalyst Dabco 15 (Airo Products), 32 g of blowing agent cyclopentane and 9 g of water are premixed, and then add 400 g of Cosmonate M200 in mixture with the high speed agitator to prepare the rigid urethane foam.

Implementation Example 10

In the mixer setting with the agitator, 50 g of product of the Example 17 of Synthesis>, 50 g of Example 18 of Synthesis, 50 g of Example 19 of Synthesis, 50 g of glycerol+EO/PO adduct polyol, 50 g of sucrose+EO/PO adduct polyol, 50 g of sorbitol+EO/PO adduct polyol, 50 g of bisphenol A+EO adduct polyol, 10 g of surfactant F-317 (Shinetsu Chemical), 10 g of catalyst Dabco 15 (Airo Products), 35 g of blowing agent cyclopentane and 9 g of water premixed, and then add 350 g of Cosmonate N-200 in mixture with the high speed agitator to prepare the rigid urethane foam.

INDUSTRIAL APPLICABILITY

As described, the high functionality polyols prepared according to recycling method of waste of the present invention by recycling waste polyester, waste polyamide, and waste polyurethane used with the animal and vegetable oils that include the waste edible oil are polymerized to facilitate the reaction to convert the double combination double bond of unsaturated fatty acid of fatty ingredients into a conjugated double bond to introduce the Diels-Alder reaction to improve the reactivity to form the sound combination in chemical structure. Therefore, in the final product of polyurethane may be prevented the separate leaching phenomenon of fatty and fatty oil. The polyols, polyurethanes, and polyurethane foams prepared according to recycling method of waste of the present invention can be employed as industrially useful materials to prepare the polyurethane and polyurethane foams having excellent mechanical and chemical properties to utilize as the useful material with environment-friendly and economic advantages.

The invention claimed is:

1. A method of preparing a polyester-amide polyol by recycling a polymer waste, the method comprising:
   (a) depolymerizing performed via trans-esterification of a mixed waste of polyethylene terephthalate and polyamide with a polymeric fatty acid mono(polyhydroxyl alcohol)ide composition produced by the reaction of a polymeric fatty acid glyceride ester with a polyhydric alcohol;
   (b) polycondensing the depolymerized products from step (a) with a polybasic acid and a polyhydric alcohol to obtain a polyester-amide oligomer composition;
   (c) reacting the oligomer composition from step (b) with an amine to obtain an amine adduct polyol composition having function of surfactant.

2. The method of claim 1, wherein the mixed waste materials are waste plastic bottles, waste blended fibers, waste carpet, or waste composite molded articles that are crushed.

3. The method of claim 1, wherein the polymeric fatty acid mono(polyhydroxyl alcohol)ide composition produced by the reaction of a polymeric fatty acid glyceride ester with a polyhydric alcohol is at least one selected from the group consisting of polymeric soybean fatty acid mono glyceride, polymeric tall fatty acid mono diethyleneglycolide, polymeric corn germ fatty acid mono sorbitolide, polymeric palm fatty acid mono tri-methylol propanide, polymeric fish fatty acid mono propylenglycolide, polymeric waste edible oil fatty acid mono glyceride, dimer acid mono glyceride, dimer acid mono ethylene glycolide, dimer acid propylene glycolide.

4. The method of claim 1, wherein the mixing ratio of polymeric fatty acid mono(polyhydroxyl alcohol)ide composition produced by the reaction of a polymeric fatty acid glyceride ester with a polyhydric alcohol to mixed waste polymer material is used in the range of 1:0.1-10 by weight.

* * * * *